(12) United States Patent
Amundson et al.

(10) Patent No.: US 10,717,325 B2
(45) Date of Patent: *Jul. 21, 2020

(54) DRIVE LINE ARRANGEMENT FOR A SELF-PROPELLED AGRICULTURAL PRODUCT APPLICATOR

(71) Applicant: CNH Industrial America LLC, New Holland, PA (US)

(72) Inventors: Jeremy A. Amundson, Willmar, MN (US); William A. Roach, Lake Lillian, MN (US); Martin L. Krohn, De Graff, MN (US)

(73) Assignee: CNH Industrial America LLC, New Holland, PA (US)

( * ) Notice: Subject to any disclaimer, the term of this patent is extended or adjusted under 35 U.S.C. 154(b) by 275 days.

This patent is subject to a terminal disclaimer.

(21) Appl. No.: 15/863,011

(22) Filed: Jan. 5, 2018

(65) Prior Publication Data

US 2019/0210406 A1 Jul. 11, 2019

(51) Int. Cl.
*B60B 35/10* (2006.01)
*B60B 35/16* (2006.01)
(Continued)

(52) U.S. Cl.
CPC ............ *B60B 35/10* (2013.01); *B60B 35/001* (2013.01); *B60B 35/109* (2013.01);
(Continued)

(58) Field of Classification Search
CPC ......... B60B 35/04; B60B 35/08; B60B 35/10; B60B 35/1036; B60B 35/1072; B60B 35/109
See application file for complete search history.

(56) References Cited

U.S. PATENT DOCUMENTS 3,833,079 A 9/1974 Gego
3,971,446 A 7/1976 Nienberg
(Continued)

FOREIGN PATENT DOCUMENTS

IN 01625DE2008 A 5/2010
RU 2 327 348 C2 11/2007
WO 91/04902 A2 4/1991

OTHER PUBLICATIONS

Chassis Engineering, Drag Racing Parts—Chassis, Suspension, and Driveline Products, Jan. 5, 2017, pp. 1-3.
(Continued)

*Primary Examiner* — Jason R Bellinger
(74) *Attorney, Agent, or Firm* — Rebecca L. Henkel; Rickard K. DeMille

(57) ABSTRACT

A drive line arrangement for self-propelled agricultural product applicator includes an engine connected to a remotely mounted pump arrangement by a driveshaft that passes through an axle of a frame of the applicator. The axle includes an axle tube extending transversely across the frame and defining front and rear facing surfaces of the axle tube, and a tubular-shaped tunnel fixedly attached to and extending through the axle from the front to the rear facing surfaces of the axle tube, and defining an internal opening of the tunnel for passage of the driveshaft through the tunnel. The tunnel extends beyond at least one of the front and rear facing surfaces of the axle tube to structurally reinforce the axle tube around the opening in the tunnel.

19 Claims, 4 Drawing Sheets

(51) Int. Cl.
*B60B 35/00* (2006.01)
*B60B 35/14* (2006.01)
*B60B 35/12* (2006.01)
*B60K 8/00* (2006.01)

(52) U.S. Cl.
CPC .......... *B60B 35/1054* (2013.01); *B60B 35/16* (2013.01); *B60B 35/122* (2013.01); *B60B 35/14* (2013.01); *B60K 8/00* (2013.01)

(56) References Cited

U.S. PATENT DOCUMENTS

| | | | |
|---|---|---|---|
| 5,992,759 A | 11/1999 | Patterson | |
| 6,139,045 A | 10/2000 | Vandenbark et al. | |
| 6,199,769 B1 | 3/2001 | Weddle | |
| 6,206,125 B1* | 3/2001 | Weddle | B60B 35/001 |
| | | | 180/209 |
| 6,386,554 B1 | 5/2002 | Weddle | |
| 6,585,056 B2 | 7/2003 | Pellenc et al. | |
| 7,717,189 B2 | 5/2010 | Shoup et al. | |
| 8,875,817 B2 | 11/2014 | Giles-Brown et al. | |
| 2011/0024222 A1 | 2/2011 | Honzek | |
| 2011/0272905 A1* | 11/2011 | MacKin | A01D 41/12 |
| | | | 280/124.11 |
| 2014/0041962 A1* | 2/2014 | Borghi | B60B 35/10 |
| | | | 182/63.1 |
| 2015/0210115 A1* | 7/2015 | David | B60B 35/1054 |
| | | | 301/128 |
| 2015/0306910 A1* | 10/2015 | Ruggeri | B60B 35/16 |
| | | | 280/638 |
| 2015/0351376 A1 | 12/2015 | Wichmann | |
| 2016/0081259 A1* | 3/2016 | Bonte | B60B 35/1009 |
| | | | 301/128 |
| 2016/0316735 A1 | 11/2016 | Pilney et al. | |
| 2017/0305190 A1* | 10/2017 | Abramov | B60B 35/1036 |
| 2019/0023071 A1* | 1/2019 | Moen | B60B 35/109 |
| 2019/0176518 A1* | 6/2019 | Roach | B60B 35/001 |

OTHER PUBLICATIONS

Resource: Engineering & Technology for a Sustainable World, A Salute to the Winners, Jan. 2014, vol. 21, Issue 1, American Society of Agricultural Engineers, pp. 1-16.
New Holland Agriculture, Guardian Rear Boom Sprayers, 2015, CNH Industrial America LLC, pp. 1-16.

* cited by examiner

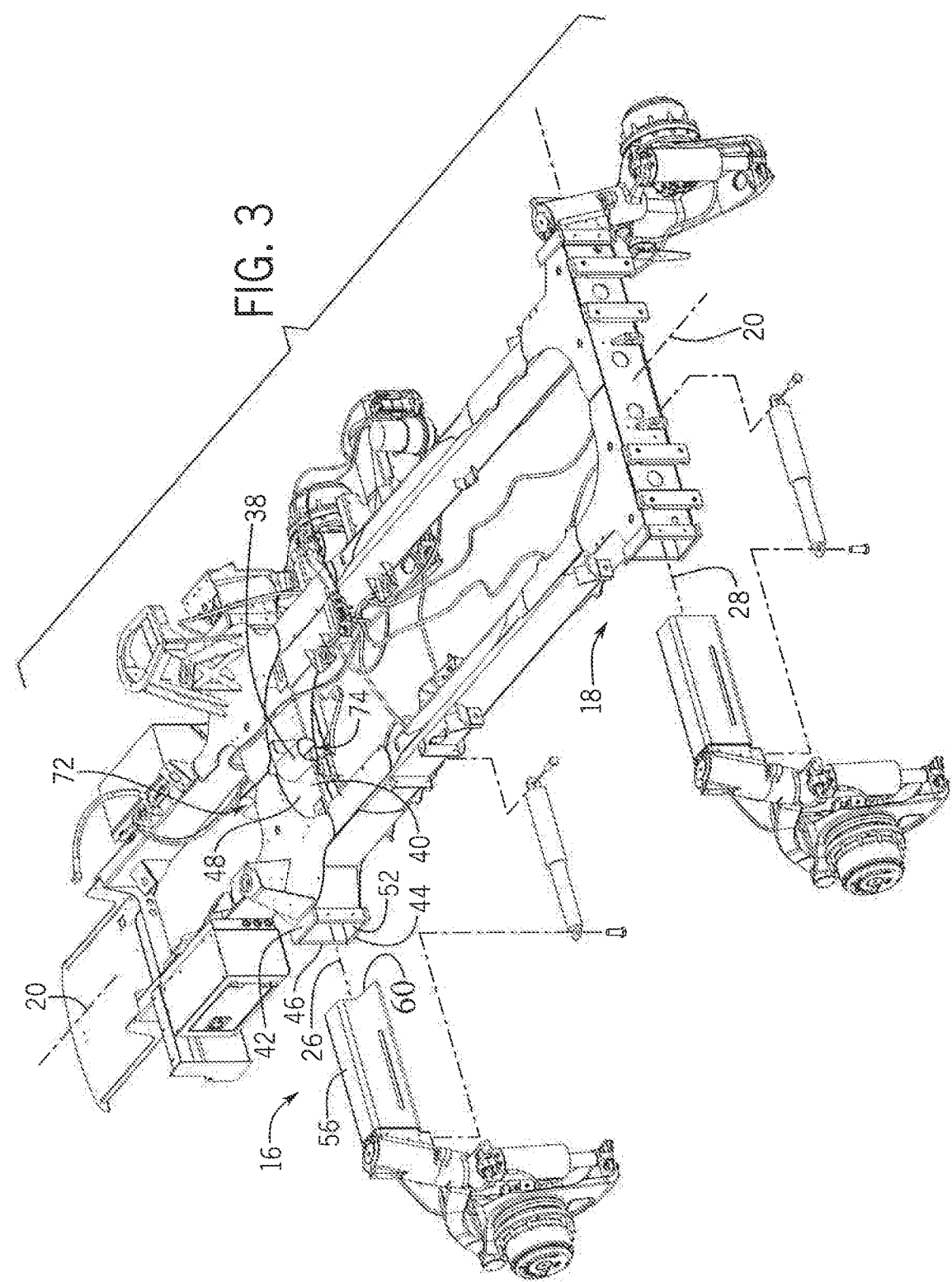

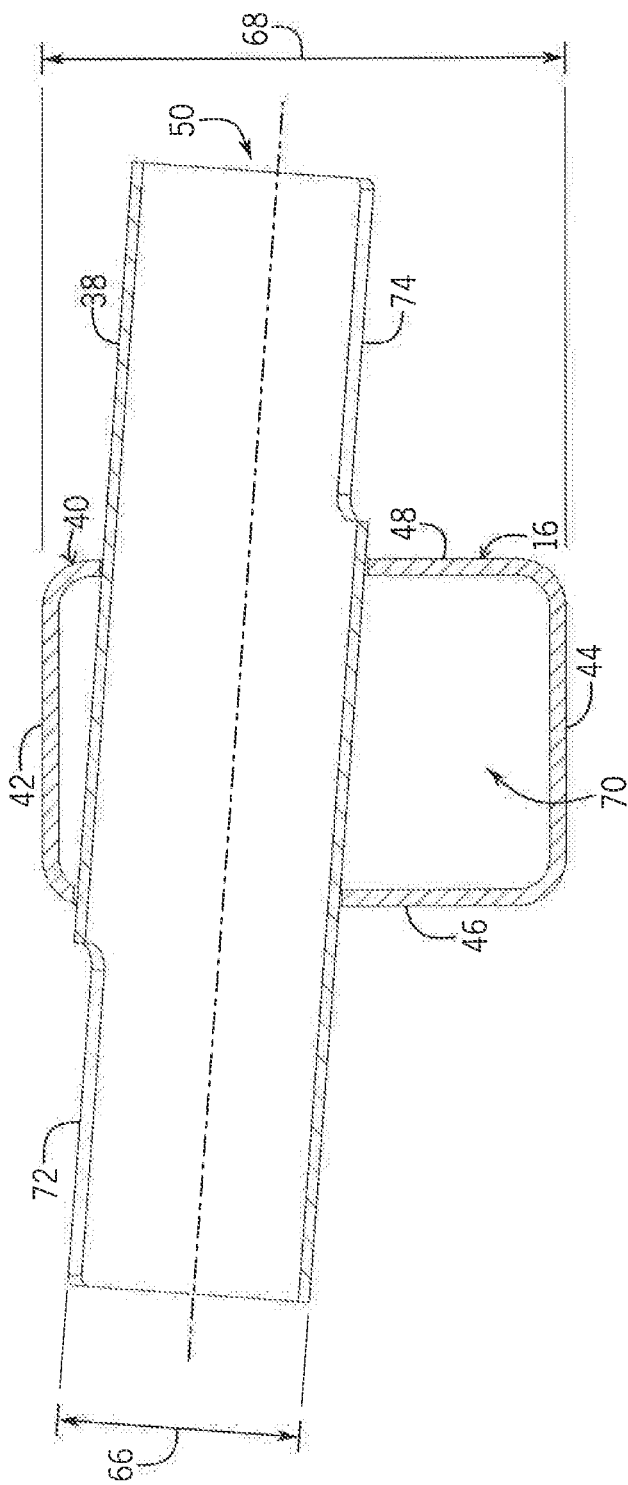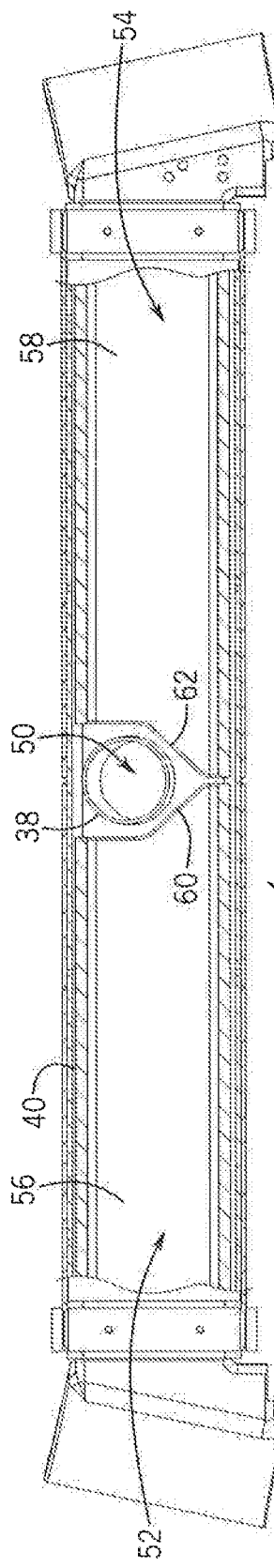

DRIVE LINE ARRANGEMENT FOR A SELF-PROPELLED AGRICULTURAL PRODUCT APPLICATOR

FIELD OF THE INVENTION

This invention generally relates to self-propelled agricultural applicators, and more particularly to drive line arrangements for such applicators.

BACKGROUND OF THE INVENTION

Agricultural chemicals and fertilizers must be applied within very narrow time windows for maximum effectiveness. In some cases, this means that application must be performed after the crops have emerged, and sometimes even after the crops have grown to a height of several feet tall. To apply chemicals and fertilizers without damaging standing crops specialized self-propelled agricultural product applicators, having high ground clearance, such as so-called high-boy sprayers or dry product applicators, are often utilized with standing crops. The high ground clearance allows the applicator to move through the standing crops without damaging them.

Such high ground clearance applicators also typically utilize independent hydrostatic drive and suspension systems for each wheel of the applicator, and provide some means for adjusting the track width of the wheels to match the row spacing of the crop being treated. Since the row spacing varies for different types of crops, and as a matter of custom in various locations, such self-propelled applicators also typically include some apparatus for adjusting the track width to match the row spacing.

In the past, self-propelled agricultural product applicators typically utilized driveline arrangements in which one or more driven devices, such as a series of pumps, connected one to another to form a pump stack, a hydrostatic or geared transmission device, or an electrical generator, for example, were attached directly to the engine, or mounted in close proximity to the engine in the engine compartment. Such a configuration requires that the engine compartment be longer than desirable, particularly in applicators having the engine mounted in a cantilevered arrangement extending forward of the wheels of the applicator.

It is desirable, therefore, to provide an improved drive line arrangement for use in self-propelled agricultural applicators in which a driven device, such as a pump stack can be mounted remotely from the engine, while still being driven directly by the engine. It is further desired that such an improved drive line arrangement will provide greater flexibility in the design of self-propelled applicators, allowing optimization of utility, performance, and improved effectiveness and efficiency of manufacture and operation.

BRIEF SUMMARY OF THE INVENTION

The invention provides an improved drive line arrangement for a self-propelled agricultural product applicator including an engine that is operatively connected to a remotely mounted driven device, such as a pump arrangement, by a driveshaft that passes through an axle of a frame of the applicator. The axle includes an axle tube extending transversely across the frame and defining front and rear facing surfaces of the axle tube, and a tubular-shaped tunnel fixedly attached to and extending through the axle from the front to the rear faces of the axle. The tunnel defines an internal opening of the tunnel for passage of the driveshaft through the tunnel.

In one form of the invention, a drive line arrangement may be provided for a self-propelled agricultural product applicator having an engine connected to a remotely mounted driven device, such as a pump arrangement, by a driveshaft that passes through an axle of a frame of the applicator. The frame may define a longitudinal axis of the frame extending from a front end to a rear end of the frame, and a transverse axis of the frame extending generally perpendicular to the longitudinal axis of the frame, with the longitudinal and transverse axes of the frame defining a substantially horizontal plane of the frame. The engine and driven device may be disposed on opposite sides of the axle along the longitudinal axis of the frame.

An axle, according to the invention, may include an axle tube extending transversely across the frame and defining top, bottom, front and rear facing surfaces of the axle tube. The axle may further include a tubular-shaped tunnel fixedly attached to and extending through the axle from the front to the rear facing surfaces of the axle tube, and defining an internal opening of the tunnel for passage of the driveshaft through the tunnel.

In some forms of the invention, the engine may be positioned in front of the axle and the driven device may be positioned to the rear of the axle. In other forms of the invention, the engine may be positioned behind the axle and driven device may be positioned ahead of the axle.

An axle, according to the invention, may be a telescoping axle arrangement with the axle tube having open ends and defining a fixed receiver for sliding receipt of left and right movable axle inserts having inner ends configured cooperatively with the tubular-shaped tunnel to extend at least partly around the tubular shaped tunnel when the axle inserts are positioned at a minimal width position of the telescoping axle.

In some forms of the invention, the tubular-shaped tunnel may have a vertical dimension that is less than a vertical dimension of the front and rear faces of the rectangular tubular body of the axle, and the tubular-shaped tunnel may positioned toward the top face of the rectangular tubular body, to thereby provide space below the tubular-shaped tunnel for the contoured inner ends of the axle inserts to extend partly underneath the tubular-shaped tunnel when the axle inserts are positioned at a minimal width position of the telescoping axle.

The tubular-shaped tunnel may extend beyond at least one of the front and rear faces of the axle tube. The tubular-shaped tunnel may also include at least one open-ended slot configured to facilitate insertion of the driveshaft through the tubular-shaped tunnel.

In some forms of the invention, the tubular-shaped tunnel may be configured and fixedly attached to the axle tube of the axle to form a structural reinforcement of the axle tube extending at least partly around the internal opening of the tunnel.

In some forms of the invention, the axle tube defines a transversely extending axis of the of the axle, and the axle tube may be subjected to torsional loading about the axis of the axle during operation of the applicator. In such applications of the invention, the tubular-shaped tunnel may be configured and fixedly attached to the axle tube of the axle to form a structural reinforcement of the axle tube in an area surrounding the opening in the tunnel, for resisting torsional loading of the axle tube.

The invention may also take the form of a self-propelled agricultural applicator including a drive line arrangement in accordance with the invention.

The invention may further take the form of a method for constructing a drive line arrangement for self-propelled agricultural product applicator. Such a method may include connecting an engine of the applicator to a remotely mounted driven device, such as a pump arrangement of the applicator using a driveshaft that passes through an axle of a frame of the applicator.

In some forms of a method, according to the invention: the axle has axle tube, and a tubular-shaped tunnel extending through the axle tube and defining an opening for passage therethrough of the drive shaft, with the tunnel extending outside of the axle tube of the axle and including at least one open-ended slot configured to facilitate insertion of the driveshaft through the tubular-shaped tunnel; and, the method may further include inserting the driveshaft through the at least one open-ended slot and through the tunnel for connection of the driveshaft between the engine and the pump arrangement after the engine and driven device have been installed in the applicator.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a perspective illustration of a frame of the applicator of FIG. 1;

FIG. 4 is a cross-sectional view showing a tunnel through an axle of the exemplary embodiments of FIGS. 1-3; and FIG. 5 is a partial cross-sectional view of a telescoping front axle arrangement of the exemplary embodiments of FIGS. 1-4.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
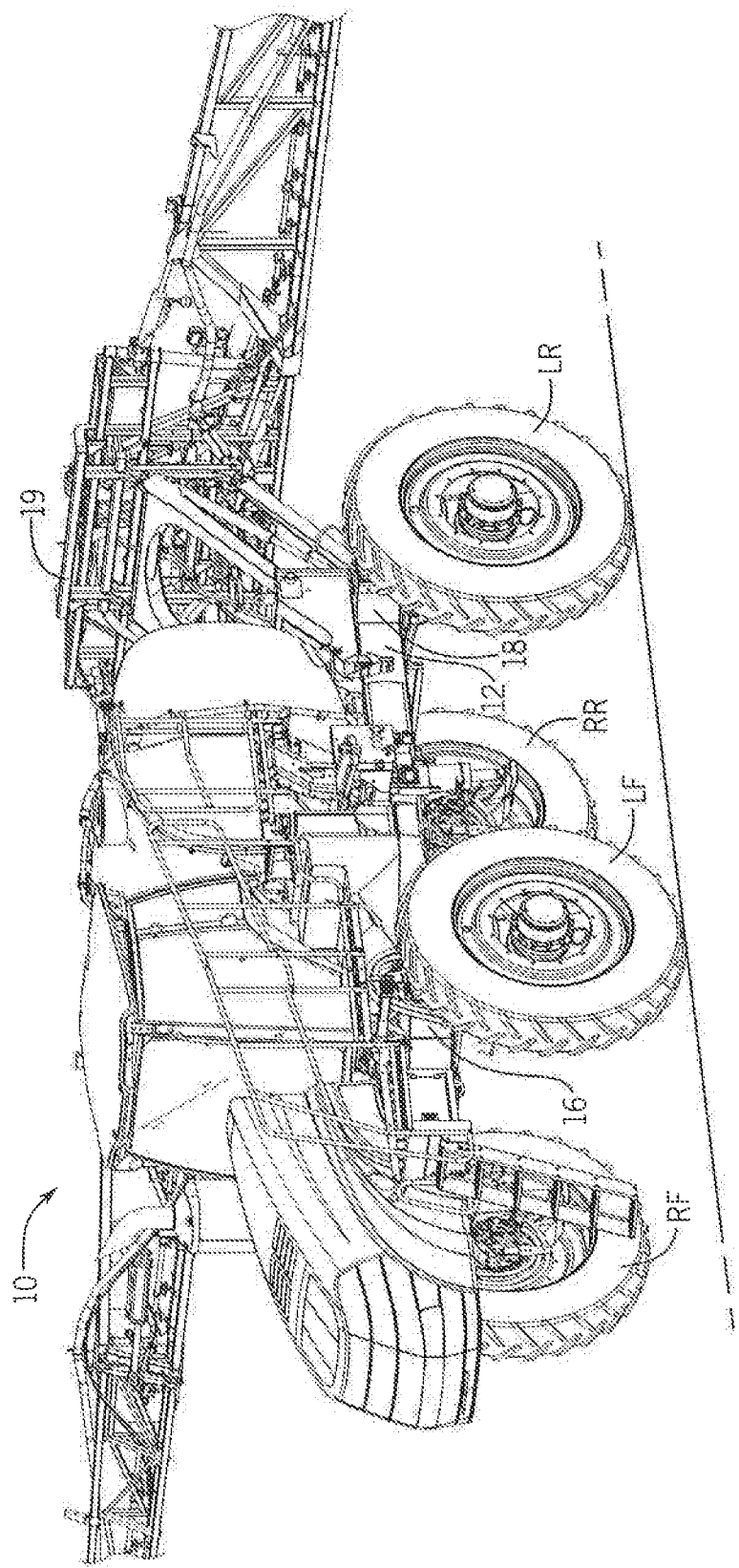
FIG. 1 is a perspective illustration of a self-propelled agricultural product applicator, according to the invention.

FIG. 1 shows an exemplary embodiment of a self-propelled agricultural product applicator 10, having a frame 12 supported by four ground engaging wheels LF,RF,LR,RR that are operatively connected to the frame 12 via front and rear telescoping axle arrangements 16,18. The exemplary embodiment of the applicator 10 is shown carrying a sprayer arrangement 19, but is configured for alternatively carrying a dry product spreader box (not shown), and for operating for short periods of time with no product distribution arrangement mounted on the frame 12.

Figure 2:
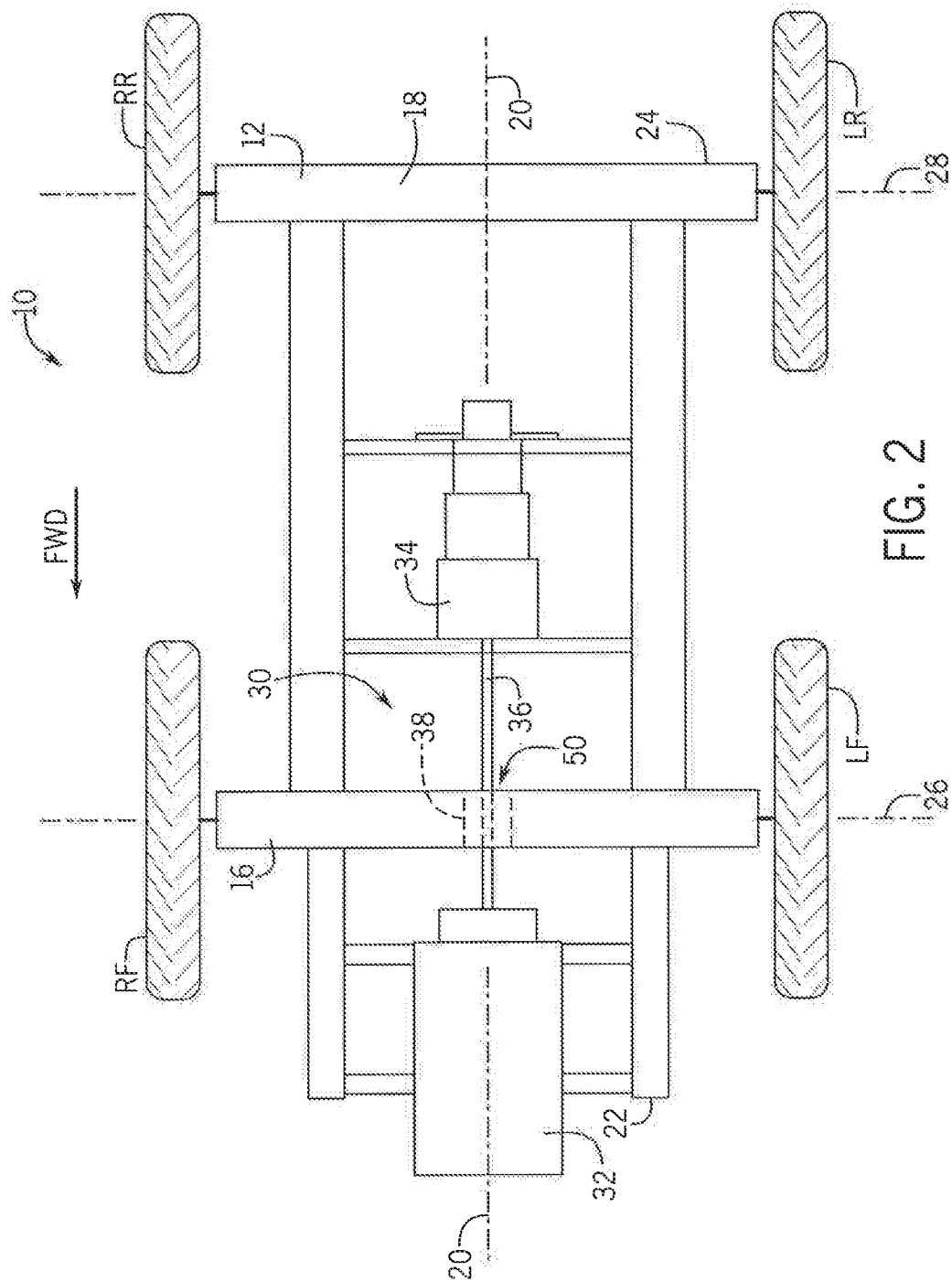
FIG. 2 is a schematic illustration of a drive line arrangement, of the applicator of FIG. 1, according to the invention.

As shown schematically in FIG. 2, the frame 12 of the applicator 10 defines a longitudinal axis 20 of the frame 12 extending from a front end 22 to a rear end 24 of the frame 12, and first and second transverse axes 26,28 of the frame 12 extending generally perpendicular to the longitudinal axis 20 of the frame 12. The front and rear transverse axes 26,28 also respectively define coincident longitudinal axes 26,28 of the front and rear axles 16,18. The longitudinal and transverse axes 20,26,28 of the frame 12 together define a substantially horizontal plane of the frame 12.

As further shown in FIG. 2, a drive line arrangement 30 of the exemplary embodiment of the self-propelled agricultural product applicator 10 includes an engine 32 connected to a remotely mounted driven device, in the form of a pump arrangement 34, by a driveshaft 36 that passes through a tubular-shaped tunnel 38 in the front axle 16 of the frame 12 of the applicator 10. The engine 32 and pump arrangement 34 are positioned on opposite sides of the front axle 16 along the longitudinal axis 20 of the frame 12. In the exemplary embodiment of the applicator 10, the engine 32 is positioned on a cantilevered portion of the frame 12 in front of the front axle 16, and the pump arrangement 34 is positioned to the rear of the front axle 16. It will be appreciated, however, that in other embodiments of the invention, the relative positions of the engine 32 and pump arrangement 34 may be reversed, so that the engine 32 is positioned behind the front axle 16, and the pump arrangement 34 is positioned in front of the front axle 16. It will be further appreciated that the invention may be practiced in similar fashion with a driveshaft passing through a rear axle instead of a front axle.

As shown in FIGS. 2-4, the front axle 16 includes an axle tube 40 having a rectangular tubular body extending transversely across the frame 12 and defining top, bottom, front and rear facing surfaces 42,44,46,48 of the axle tube 40. The front axle 16 further includes the tubular-shaped tunnel 38 fixedly welded to and extending through the front axle 16 from the front to the rear faces 46,48 of the axle tube 40 of the front axle 16, and defining an internal opening 50 of the tunnel 38 for passage of the driveshaft 36 through the tunnel 38. It will be appreciated that, although the axle tube 40 in the exemplary embodiment of the applicator 10 is rectangular-shaped, and practice of the invention is not limited to axle tubes with rectangular shapes. It is contemplated in other embodiments of the invention the axle tube 40 might be cylindrical-shaped, oval-shaped, hexagonal, or have any other tubular shape appropriate for practicing the invention. In similar fashion, although the tunnel 38 is illustrated as a cylinder in the exemplary embodiment of the applicator 10, it could have any other appropriate tubular shape in other embodiments of the invention.

As noted above, and best seen in FIG. 3, the front and rear axles 16,18 in the applicator 10 are telescoping axle arrangements. As shown in FIGS. 3 and 5, the rectangular axle tube 40 of the front axle 16 has left and right open ends 52,54, and is configured to be a fixed receiver for sliding receipt of left and right movable axle inserts 56,58 having respective inner ends 60,62 that are configured cooperatively with the tubular-shaped tunnel 38 to extend at least partly around the tubular shaped tunnel 38 when the axle inserts 56,58 are positioned at a minimal width position of the telescoping front axle 16, as shown in FIG. 5.

As shown in FIG. 4, the tubular-shaped tunnel 38 has a vertical dimension 66 that is less than a vertical dimension 68 of the front and rear faces 46,48 of the rectangular axle tube 40 of the front axle 16. The tubular-shaped tunnel 38 is also positioned toward the top face 42 of the rectangular axle tube 40, to thereby provide space 70 below the tubular-shaped tunnel 38 for the contoured inner ends 60,62 of the axle inserts 56,58 to extend partly underneath the tubular-shaped tunnel 38, as shown in FIG. 5, when the axle inserts 56,58 are positioned at the minimal width position of the telescoping front axle 16.

As further illustrated in FIGS. 3 and 4, the tubular-shaped tunnel 38 extends beyond both the front and rear faces 46,48 of the rectangular axle tube 40 of the front axle 16. The portion of the tubular-shaped tunnel 38 of the exemplary embodiment extending from the front side 46 of the axle tube 40 also includes an upwardly facing open-ended slot 72 configured to facilitate insertion of the driveshaft 36 through the tubular-shaped tunnel 38. Similarly, the portion of the tubular-shaped tunnel 38 of the exemplary embodiment extending from the rear side 48 of the axle tube 40 also includes a downwardly facing open-ended slot 74 configured to facilitate insertion of the driveshaft 36 through the tubular-shaped tunnel 38.

Those having skill in the art will appreciate that the upwardly and downwardly opening open ended slots 72,74 in the tunnel 38 will significantly facilitate inserting the driveshaft through the tunnel 38 for connection of the driveshaft 36 between the engine 32 and the pump arrangement 34, and removal of the driveshaft 36, particularly after the engine 32 and pump arrangement 34 have been installed in the applicator 10.

Those having skill in the art will also appreciate that the axle tube 40 of the front axle 16 is also subjected to considerable bending and torsional loading during operation of the applicator 10. It will be further appreciated that having the tubular-shaped tunnel 38 be configured and fixedly attached to the rectangular axle tube 40 of the front axle 16 in the manner described above allows the tunnel 38 to provide significant structural reinforcement of the axle tube 40 of the front axle 16 around the opening 50 through the front axle 16.

From the foregoing description of exemplary embodiments, it will be appreciated that the invention does indeed provide an improved drive line arrangement for use in self-propelled agricultural applicators in which a driven device, such as a pump stack can be mounted remotely from the engine, while still being driven directly by the engine. It will be further appreciated that practice of the invention will provide greater flexibility in the design of self-propelled applicators, allowing optimization of utility, performance, and improved effectiveness and efficiency of manufacture and operation. It will be further appreciated that practice of the invention allows for significantly shortening the engine compartment of a self-propelled agricultural applicator, which is particularly advantageous in applicators having the engine mounted on a cantilevered section of the frame extending beyond the axle, to the front or the rear of an applicator.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A drive line arrangement for a self-propelled agricultural product applicator having an engine connected to a remotely mounted driven device by a driveshaft that passes through an axle of a frame of the applicator, with the frame defining a longitudinal axis of the frame extending from a front end to a rear end of the frame, and a transverse axis of the frame extending generally perpendicular to the longitudinal axis of the frame, with the longitudinal and transverse axes of the frame defining a substantially horizontal plane of the frame, and the engine and driven device being disposed on opposite sides of the axle along the longitudinal axis of the frame, wherein the axle comprises:
   an axle tube extending transversely across the frame and defining top, bottom, front and rear facing surfaces of the axle tube, and
   a tubular-shaped tunnel fixedly attached to and extending through the axle from the front to the rear facing surfaces of the axle tube, and defining an internal opening of the tunnel for passage of the driveshaft through the tunnel.

2. The drive line arrangement of claim 1, wherein the driven device is a pump arrangement.

3. The drive line arrangement of claim 1, wherein the axle is a telescoping axle arrangement with the axle tube having open ends and defining a fixed receiver for sliding receipt of left and right movable axle inserts having inner ends configured cooperatively with the tubular-shaped tunnel to extend at least partly around the tubular shaped tunnel when the axle inserts are positioned at a minimal width position of the telescoping axle.

4. The drive line arrangement of claim 3, wherein the tubular-shaped tunnel has a vertical dimension that is less than a vertical dimension of the front and rear facing surfaces of the axle tube, and the tubular-shaped tunnel is positioned toward the top face of the axle tube, to thereby provide space below the tubular-shaped tunnel for the contoured inner ends of the axle inserts to extend partly underneath the tubular-shaped tunnel when the axle inserts are positioned at a minimal width position of the telescoping axle.

5. The drive line arrangement of claim 1, wherein the tubular-shaped tunnel extends beyond at least one of the front and rear faces of the axle tube of the axle.

6. The drive line arrangement of claim 5, wherein the tubular-shaped tunnel includes at least one open-ended slot configured to facilitate insertion of the driveshaft through the tubular-shaped tunnel.

7. The drive line arrangement of claim 5, wherein the tubular-shaped tunnel is configured and fixedly attached to the axle tube of the axle to form a structural reinforcement of the axle tube extending at least partly around the internal opening of the tunnel.

8. The drive line arrangement of claim 7, wherein:
the axle tube defines a transversely extending axis of the of the axle, and the axle tube is subjected to torsional loading about the axis of the axle during operation of the applicator; and
the tubular-shaped tunnel is configured and fixedly attached to the axle tube of the axle to form a structural reinforcement of the axle tube about the opening in the tunnel for resisting torsional loading of the axle.

9. The drive line arrangement of claim 1, wherein:
the engine is positioned in front of the axle and the pump arrangement is positioned to the rear of the axle;
the axle is a telescoping axle arrangement with the axle tube having open ends and defining a fixed receiver for sliding receipt of left and right movable axle inserts having inner ends configured cooperatively with the tubular-shaped tunnel to extend at least partly around the tubular shaped tunnel;
the tubular-shaped tunnel has a vertical dimension that is less than a vertical dimension of the axle tube of the axle, and the tubular-shaped tunnel is positioned toward the top face of the axle tube, to thereby provide space below the tubular-shaped tunnel for the contoured inner ends of the axle inserts to extend partly underneath the tubular-shaped tunnel when the axle inserts are positioned at a minimal width position of the telescoping axle;
the tubular-shaped tunnel extends beyond at least one of the front and rear faces of the axle tube of the axle, and is configured and fixedly attached to the axle tube of the axle to form a structural reinforcement of the axle tube extending at least partly around the internal opening of the tunnel; and
the tubular-shaped tunnel includes at least one open-ended slot configured to facilitate insertion of the driveshaft through the tubular-shaped tunnel.

10. A self-propelled agricultural applicator including a drive line arrangement for operatively connecting an engine of the applicator to a remotely mounted pump arrangement of the applicator by a driveshaft that passes through an axle of a frame of the applicator, with the frame defining a longitudinal axis of the frame extending from a front end to a rear end of the frame, and a transverse axis of the frame extending generally perpendicular to the longitudinal axis of the frame, with the longitudinal and transverse axes of the frame defining a substantially horizontal plane of the frame, and the engine and pump arrangement being disposed on opposite sides of the axle along the longitudinal axis of the frame, wherein the axle comprises:
an axle tube extending transversely across the frame and defining top, bottom, front and rear facing surfaces of the axle tube, and
a tubular-shaped tunnel fixedly attached to and extending through the axle from the front to the rear faces of the axle tube, and defining an internal opening of the tunnel for passage of the driveshaft through the tunnel.

11. The self-propelled agricultural applicator of claim 10, wherein the frame includes a cantilevered portion extending forward of the axle and the engine is mounted on the cantilevered portion of the frame such that the engine is positioned in front of the axle and the pump arrangement is positioned to the rear of the axle.

12. The self-propelled agricultural applicator of claim 10, wherein the axle is a telescoping axle arrangement with the axle tube having open ends and defining a fixed receiver for sliding receipt of left and right movable axle inserts having inner ends configured cooperatively with the tubular-shaped tunnel to extend at least partly around the tubular shaped tunnel when the axle inserts are positioned at a minimal width position of the telescoping axle.

13. The drive line arrangement of claim 12, wherein the tubular-shaped tunnel has a vertical dimension that is less than a vertical dimension of the axle tube, and the tubular-shaped tunnel is positioned toward the top face of the axle tube, to thereby provide space below the tubular-shaped tunnel for the contoured inner ends of the axle inserts to extend partly underneath the tubular-shaped tunnel when the axle inserts are positioned at a minimal width position of the telescoping axle.

14. The self-propelled agricultural applicator of claim 10, wherein the tubular-shaped tunnel extends beyond at least one of the front and rear faces of the axle tube of the axle.

15. The self-propelled agricultural applicator of claim 14, wherein the tubular-shaped tunnel includes at least one open-ended slot configured to facilitate insertion of the driveshaft through the tubular-shaped tunnel.

16. The self-propelled agricultural applicator of claim 14, wherein the tubular-shaped tunnel is configured and fixedly attached to the axle tube of the axle to form a structural reinforcement of the axle extending at least partly around the internal opening of the tunnel.

17. The self-propelled agricultural applicator of claim 16, wherein:
the axle tube defines a transversely extending axis of the of the axle, and the axle tube is subjected to torsional loading about the axis of the axle during operation of the applicator; and
the tubular-shaped tunnel is configured and fixedly attached to the axle tube to form a structural reinforcement of the axle tube about the opening in the tunnel for resisting torsional loading of the axle tube.

18. The self-propelled agricultural applicator of claim 10, wherein:
the engine is positioned in front of the axle and the pump arrangement is positioned to the rear of the axle;
the axle is a telescoping axle arrangement with the axle tube having open ends and defining a fixed receiver for sliding receipt of left and right movable axle inserts having inner ends configured cooperatively with the tubular-shaped tunnel to extend at least partly around the tubular shaped tunnel;
the tubular-shaped tunnel has a vertical dimension that is less than a vertical dimension of the axle tube of the axle, and the tubular-shaped tunnel is positioned toward the top face of the axle tube, to thereby provide space below the tubular-shaped tunnel for the contoured inner ends of the axle inserts to extend partly underneath the tubular-shaped tunnel when the axle inserts are positioned at a minimal width position of the telescoping axle;
the tubular-shaped tunnel extends beyond at least one of the front and rear facing surfaces of the axle tube of the axle, and is configured and fixedly attached to the axle tube to form a structural reinforcement of the axle tube extending at least partly around the internal opening of the tunnel; and the tubular-shaped tunnel includes at least one open-ended slot configured to facilitate insertion of the driveshaft through the tubular-shaped tunnel.

19. A method for constructing a drive line arrangement for a self-propelled agricultural product applicator, the method comprising:

connecting an engine of the applicator to a remotely mounted driven device of the applicator using a driveshaft that passed through an axle of a frame of the applicator;

wherein:

the axle has an axle tube, and a tubular-shaped tunnel extending through the axle tube and defining an opening for passage therethrough of the drive shaft, with the tunnel extending outside of the axle tube of the axle and including at least one open-ended slot configured to facilitate insertion of the driveshaft through the tubular-shaped tunnel; and the method further includes inserting the driveshaft through the at least one open-ended slot and through the tunnel for connection of the driveshaft between the engine and the driven device after the engine and driven device have been installed in the applicator.

\* \* \* \* \*